(12) United States Patent
Pandey et al.

(10) Patent No.: US 8,934,904 B2
(45) Date of Patent: Jan. 13, 2015

(54) METHOD AND APPARATUS FOR DATA COMMUNICATION

(71) Applicant: Motorola Solutions, Inc., Schaumburg, IL (US)

(72) Inventors: Aparna Pandey, Chicago, IL (US); Harish Bhandiwad, Hoffman Estates, IL (US); Randy L. Ekl, Lake Zurich, IL (US); Ryan P. Ziolko, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 38 days.

(21) Appl. No.: 13/691,003

(22) Filed: Nov. 30, 2012

(65) Prior Publication Data

US 2014/0155064 A1     Jun. 5, 2014

(51) Int. Cl.
| | |
|---|---|
| *H04W 36/00* | (2009.01) |
| *H04M 3/00* | (2006.01) |
| *H04L 12/56* | (2006.01) |
| *H04W 36/22* | (2009.01) |
| *H04W 36/14* | (2009.01) |
| *H04W 16/32* | (2009.01) |

(52) U.S. Cl.
CPC .............. *H04W 36/22* (2013.01); *H04W 36/14* (2013.01); *H04W 16/32* (2013.01)
USPC ............ 455/436; 455/418; 455/450; 370/390

(58) Field of Classification Search
CPC ...... H04W 36/22; H04W 8/245; H04L 12/18; H04L 1/161; G06F 8/65
USPC .................. 455/436, 418, 450; 370/390, 335
See application file for complete search history.

(56) References Cited

U.S. PATENT DOCUMENTS

| | | | |
|---|---|---|---|
| 8,023,469 B2 | 9/2011 | Sachs | |
| 2008/0040500 A1* | 2/2008 | Cohen | ........................ 709/231 |

(Continued)

FOREIGN PATENT DOCUMENTS

| | | |
|---|---|---|
| WO | 2011098658 A1 | 8/2011 |
| WO | 2012149954 A1 | 11/2012 |

OTHER PUBLICATIONS

PCT International Search Report Dated April 28, 2014 for Counterpart Application PCT/US2013/070661.

(Continued)

*Primary Examiner* — Jinsong Hu
*Assistant Examiner* — William Nealon
(74) *Attorney, Agent, or Firm* — Steven A. May

(57) ABSTRACT

A method and apparatus for data communication. The method includes determining that a first nested network, is available to a plurality of user terminals, the first terminal providing a data interface to a first primary network. The method further includes determining that traffic on the first primary network can be reduced by moving one or more user terminals of the plurality of user terminals from the first primary network to the nested network. The one or more user terminals are then directed to move to the nested network.

18 Claims, 8 Drawing Sheets

(56) References Cited

U.S. PATENT DOCUMENTS

| | | | |
|---|---|---|---|
| 2009/0318124 A1* | 12/2009 | Haughn | 455/418 |
| 2010/0041411 A1* | 2/2010 | Mallik et al. | 455/450 |
| 2010/0202454 A1* | 8/2010 | Miller et al. | 370/390 |
| 2011/0116499 A1 | 5/2011 | Lim et al. | |
| 2011/0320588 A1 | 12/2011 | Raleigh et al. | |
| 2012/0044908 A1 | 2/2012 | Spinelli et al. | |
| 2012/0087370 A1* | 4/2012 | Pitts | 370/390 |
| 2012/0178448 A1* | 7/2012 | Yuk et al. | 455/435.1 |
| 2012/0230191 A1* | 9/2012 | Fang | 370/235 |
| 2012/0281674 A1 | 11/2012 | Jackson et al. | |

OTHER PUBLICATIONS

Jannie Tervonen, "Deliverable DA2.2.22 Offloading Traffic From Cellular Networks With PBRM", Internet Citation, Jun. 30, 2010, p. 1-39, XP007919591.

Ngoc Minh Do, et al. "Hybcast: Rich Content Dissemination in Gybrid Cellular and 802.11 Ad Hoc Networks", Reliable Distributed Systems (SRDS)2012 IEEE 31st Symposium on, IEEE, Oct. 8, 2012, p. 352-361, XP032323018.

Li Lao, et al. "Reducing Multicast Traffic Load for Cellular Networks Using Ad Hoc Networks", Quality of Service in Heterogeneous Wired/Sireless Networks, 2005, Sec Ond International Conference on, Orlando, FL, Aug. 22-24, 2005, p. 31-31, XP010859421.

* cited by examiner

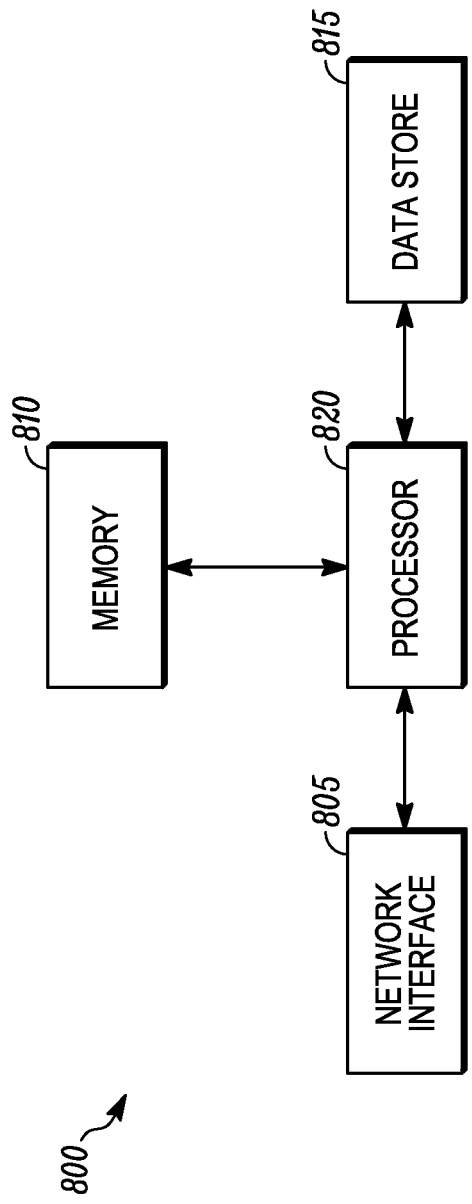

METHOD AND APPARATUS FOR DATA COMMUNICATION

FIELD OF THE DISCLOSURE

The present disclosure relates generally to data communication and more particularly to data communication using nested networks.

BACKGROUND

Recent advances in cellular technology, such as Long Term Evolution (LTE) networks developed by the 3rd Generation Partnership Project (3GPP), have transformed public safety communications. The advances enable better protection of first responders at an incident scene, such as police, fire and ambulance personnel, along with protection of the communities they serve.

Rich-media information is available to decision makers in various locations, which enables good decisions to be made quickly and safely. The Rich-media information can include streaming video of an incident scene, which can be made available to both first responders and coordination personnel. This enables efficient determination of risks, which facilitates good decision making, as well as enabling efficient communication between stakeholders and efficient coordination of resources.

Despite these great advances in cellular networking technology, bandwidth is still a scarce resource in many cellular networks. While bandwidth in such networks has increased in recent years, demand for bandwidth has increased at at least similar rates, if not higher, as high-bandwidth applications such as streaming video become more popular. Similar bandwidth limitations affect Public Safety Radio.

Portable wireless devices are commonly able to support a plurality of wired and wireless data networking standards, including cellular standards and Wireless Local Area Network (WLAN) standards. A shortcoming of today's technology is that there is currently no effective way to manage the use of networks at an incident scene to suit Public Safety needs. Accordingly, there is a need for an improved method and apparatus for data communication.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 8 illustrates a computing system, in accordance with some embodiments.

Figure 1:
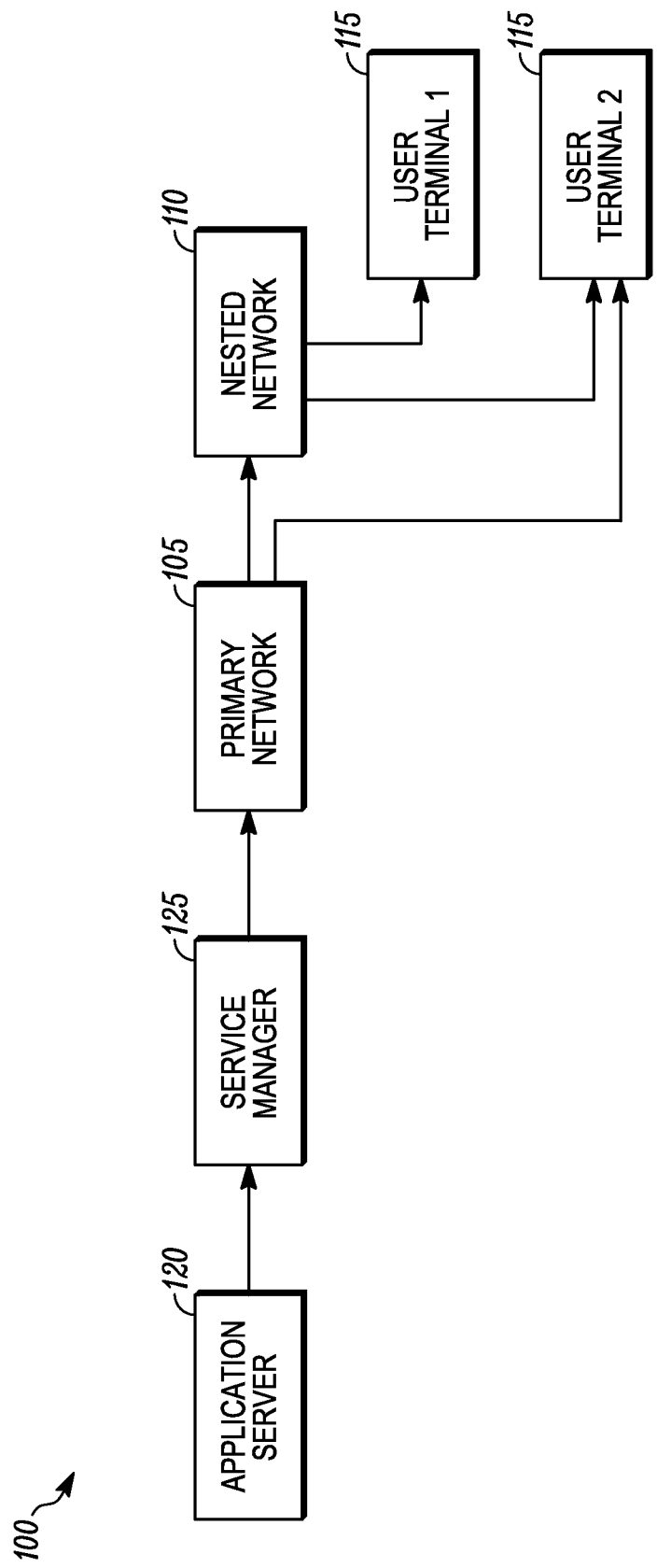
FIG. 1 is a block diagram of a data communication system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to a certain embodiments, the invention resides in a data communication method including: determining that a first nested network, that provides a data interface to a first primary network, is available to a plurality of user terminals; determining that traffic on the first primary network can be reduced by moving one or more user terminals of the plurality of user terminals from the first primary network to the nested network; and directing the one or more user terminals to move to the nested network.

Advantages of certain embodiments of the present invention include an ability to extend capacity of networks, decrease interference between networks, and optimize network resources. A further advantage of certain embodiments of the present invention is an ability to extend the coverage of the primary network via the nested network.

FIG. 1 is a block diagram of a data communication system 100, according to an embodiment of the present invention.

The data communication system 100 includes a primary network 105 and a nested network 110 connected to the primary network 105. The nested network 110 provides an air interface that operates in parallel with a separate air interface provided by the primary network 105, such that a coverage area of the nested network 110 overlaps with a coverage area of the primary network 105. Thus a user terminal, such as user terminals 115, residing in the overlapping coverage areas may be provided wireless service by both the primary network 105 and the nested network 110.

In one embodiment of the present invention, each of the primary network 105 and the nested network 110 may share a same access node, such as an access point, base station, Node B, or eNodeB, but be implemented by a different transceiver within the access node, wherein a first such transceiver supports a first wireless technology and a second such transceiver supports a second wireless technology that may be the same as, or different from, the first wireless technology. Thus a user terminal served by the access node, such as user terminals 115, may concurrently communicate with both the primary network 105 via a first air interface and wireless technology and the nested network via second air interface and wireless technology, which air interfaces are different but which wireless technologies may be different or the same. In another embodiment of the present invention, each of the primary network 105 and the nested network 110 may be implemented by a separate access node in close proximity to the access node of the other network, again such that a user terminal, such as user terminals 115, may concurrently communicate with both the primary network 105 via a first air interface and wireless technology and with the nested network 110 via a second air interface and wireless technology, which air interfaces are different but which wireless technologies may be different or the same. In either event, the access node employed by the nested network 110 has a data interface to, and uses, network elements of the primary network 105, such as a mobile switching center (MSC) or other access network gateway and network elements of a core network, such as an Evolved Packet Core (EPC), (not shown) to backhaul uplink data received from, and to receive downlink data intended for, user terminals serviced by the nested network 110.

Preferably, the primary network 105 is a Third Generation Partnership Program (3GPP) Long Term Evolution (LTE) wireless network that operates in accordance with the 3GPP LTE standards and the nested network 110 is a WiFi network that operates in accordance with the Institute of Electrical and Electronics Engineers (IEEE) 802.11 standards. However, in other embodiments of the present invention, the primary network 105 may implement any wireless technology, such as a cellular network that operates according to a Third Generation Partnership Program (3GPP) or 3GPP2 standard, including Long Term Evolution (LTE), Enhanced Data rates for GSM Evolution (EDGE), General packet radio service (GPRS), High Speed Packet Access (HSPA), Code division multiple access (CDMA) and Evolution-Data Optimized (EVDO), a wireless network according to an Institute of Electrical and Electronics Engineers (IEEE) standard, including 802.16-based Worldwide Interoperability for Microwave Access (WiMAX) and 802.11-based Wireless Local Area Network (LAN), and a Land Mobile Radio System. Similarly, the nested network 110 may implement any wireless technology, preferably a wireless technology different from the primary network 105, such as those described above in the context of the primary network 105. Furthermore, the nested network 110 can comprise a picocell, femtocell or relay. As discussed in further detail below, the nested network can comprise a local server or smart relay, which translates data to a format receivable by one or more user terminals 115. Furthermore, in one embodiment, the nested network 110 resides in a mobile or a portable entity such as a vehicle or a command van.

One or more group services are made available to a plurality of user terminals 115 through an application server 120. Group services are essentially any application which is shared among several users. Examples of group services include, but are not limited to, streaming audio, streaming video, group push-to-talk, group image transfer, interactive graphics, multi-user games and file download.

The user terminals 115 access the one or more group services through either the primary network 105 or the nested network 110, and a service manager 125 controls whether the user terminal 115 connects to the primary network 105 or to the nested network 110.

The service manager 125 monitors the plurality of user terminal 115, including their location and the group services that are being used. The location of the one or more user terminals 115 can be determined by the one or more user terminals 115, for example using a Global Positioning System (GPS), and subsequently sent to the service manager 125.

According to certain embodiments, the user terminals 115 each provide the service manager 125 with a neighbor report including all networks, such as one or more nested networks 110, which can be accessed by the user terminals 115. The neighbor reports can further include one or more of a signal strength, a loading or channel utilization of each network, services provided by each network, whether a network has access to the application server 120, or if the network includes a local application server.

Alternatively, the location of the one or more user terminals 115 can be determined using an external service such as an incident and command system or a Computer-aided-Dispatch (CAD) system, and sent to the service manager 125.

The location can also be provided by human intervention such as a CAD operator entering this information.

Based upon a monitoring of the user terminals 115, the service manager 125 can determine that one or more user terminals 115 are within range of the nested network 110. This can, for example, be based upon a comparison of a location of the user terminals 115 with a location of the nested network 110.

The service manager 125 can then determine if bandwidth (i.e. traffic) on the primary network 105 can be reduced by moving one or more user terminals 115 to the nested network 110. This can, for example, be done by determining that two user terminals 115 are consuming a group service and are independently receiving the same data. Accordingly, by moving the two user terminals 115 to the nested network 110, bandwidth in the primary network 105 can be reduced. That is because only a single stream needs to be sent on the primary network 105 to the nested network 110, rather than two individual streams.

Similarly, the service manager 125 can determine that traffic on the primary network 105 can be reduced by determining that a plurality of unicast streams on the primary network 105 can be replaced by a single unicast stream on the primary network 105 and a multicast stream on the nested network 110. According to certain embodiments, when the nested network 110 is 3GPP based, the multicast stream can, for example, comprise a 3GPP Multimedia Broadcast Multicast Service (MBMS) stream.

According to yet further embodiments, the nested network 110 can act as a smart relay, translating data from one format or standard to another. As an illustrative example, the nested network 110 can receive MBMS multicast or broadcast data, which is in turn sent to the user terminals 115 in the nested network 110 via unicast transmissions. In this case, the nested network 110 can, for example, include a Hypertext Transfer Protocol (HTTP) server, File Transfer Protocol (FTP) server, or the like.

Furthermore, in one embodiment where the primary network 105 and the nested network 110 are MBMS-enabled but the user terminals 115 are not, the nested network 110 can be used to relay the MBMS information from the primary network 105 to the user terminals 115. In this case, the nested network 110 can receive a multicast MBMS stream from the primary network 105 and relay it to user terminals 115 as, for example, WLAN multicast or WLAN unicast streams. Thereby, the nested network 110 can be used to extend the MBMS service to non-MBMS enabled user terminals 115.

When there are many user terminals 115, and/or many group services, the service manager 125 can globally optimize bandwidth reduction on the primary network 105 by selectively choosing which user terminals 115 should join the nested network 110.

Further, the service manager 125 can optimize a number of nested networks 110 to activate in an incident scene. For example, the service manager 125 can determine one or more nested networks 110 for one or more user terminals 115 that minimizes a number of traffic streams required on the primary network 105, that is a number of nested networks 110 served by the primary network 105 and a number of user terminals 115 directly served by primary network 105, such that each user terminal 115 gets at least a minimal acceptable quality for the group service.

As will be readily understood by the skilled addressee, the service manager 125 can choose to constrain the optimization problem in a number of different ways, including but not limited to prioritizing or deprioritizing certain user terminals 115, group services or service areas. Further, a nested network 110 can be given a higher weight for selection if it already supports a group service, supports high power/long range wireless connectivity, or if it is expected to be less mobile and/or more centrally located.

Further, any optimization may take into account hysteresis values to provide stability. A hysteresis factor can be incorporated into the system 100 in a variety of ways, such as adding a hysteresis factor to a "minimal acceptable quality" parameter, including a requirement that the nested network 110 supports a minimum number of user terminals 115, or including a dwell timer so that network topologies are not reconfigured too often.

The service manager 125 can then direct certain user terminals 115 to move to the nested network 110 to access the group service. If multiple nested networks 110 exist in the vicinity of the user terminals 115, the service manager 125 can direct certain user terminals 115 to move to a specific nested network 110.

In one embodiment, if the nested network 110 already has the group service ongoing, the service manager 125 can provide to the user terminals 115 additional information about the group service such as the IP multicast address, port numbers, any synchronization information, security material and the like. Alternatively, the user terminal 115 can receive this information directly from service announcements of the nested network 110.

If the nested network 110 does not already support the service, then the service manager 125 can request the application server 120 to serve the group service on the nested network 110.

The user terminals 115 that are directed to move to the nested network 110 can still stay connected to the primary network 105 to access other services, such as non-group services or group services that are not supported by the nested network 110.

The service manager 125 is shown to reside outside the primary network 105. However, according to alternative embodiments the service manager 125 can reside in the primary network 105. In one embodiment, the service manager 125 resides in a core network of primary network 105 and in another embodiment, the service manager 125 resides in a Radio Access Network of the primary network 105. Similarly, according to certain embodiments, the application server 120 and the service manager 125 can form a single entity. This may be particularly suitable when the primary network 105 is a private network and all group services are delivered from the application server 120.

As will be readily understood by the skilled addressee, the application server 120 and the service manager 125 are logical functions that can be distributed amongst more than one node with inter-node communications to retain a centralized control function. In particular, a subset of a functionality of the application server 120 and/or the service manager 125 can reside in the nested network 110. As an illustrative example, the system 100 can comprise a master-slave distribution, wherein master functionality of the application server 120 primarily resides, for example, in the primary network 105, and slave functionality of the application server 120 resides in the nested network 110. In this case, the master functionality of the application server 120 acts as a controlling entity, i.e. master, to the slave functionality of the application server 120. Similarly, the service manager 125 can have such a master-slave distribution.

As a further illustrative example, the system 100 can comprise a peer to peer distribution, wherein functionality of the application server 120 and/or the service manager 125 is distributed between the primary network 105 and the nested network 110. As will be readily understood by those skilled in the art, a peer-to-peer distribution comprises a plurality of components that can function individually and in the absence of the other components, whereas a master-slave distribution relies on a centralized controlling entity.

Figure 2:
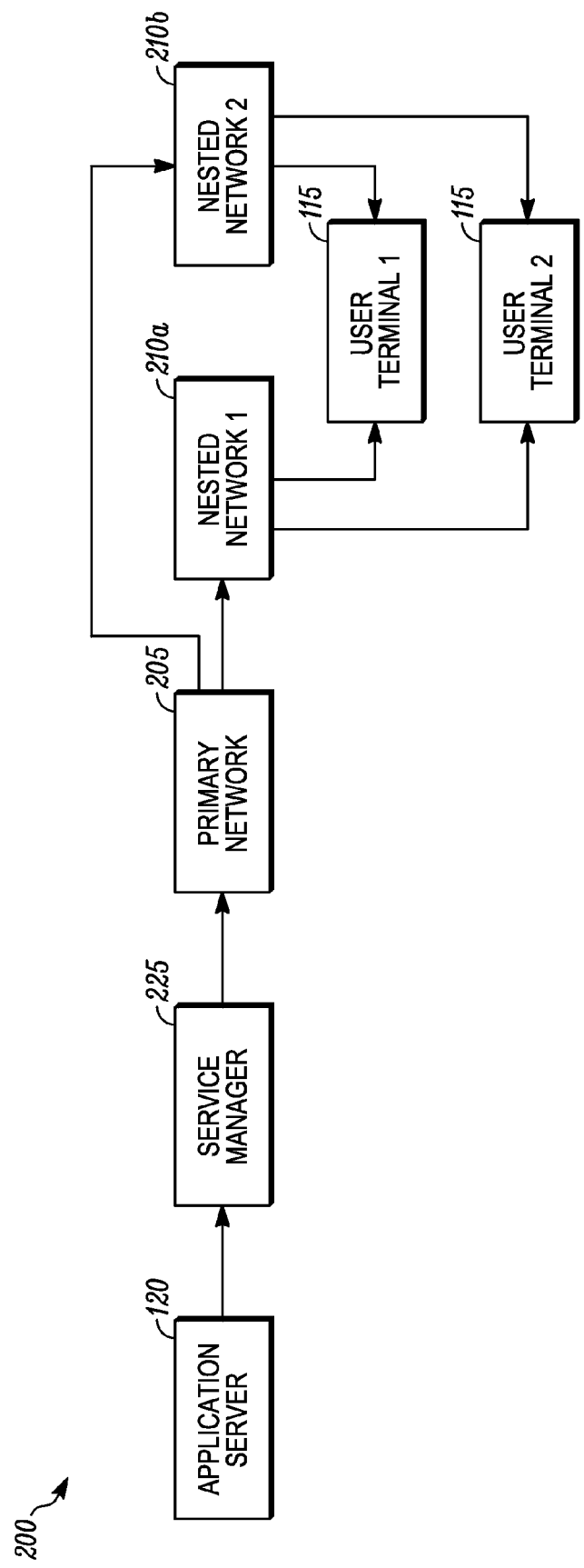
FIG. 2 is a block diagram of a data communication system, in accordance with some embodiments.

FIG. 2 is a block diagram of a data communication system 200, according to an embodiment of the present invention.

The system 200 includes the application server 120 and the plurality of user terminals 115 of the system 100 of FIG. 1. The system 200 further includes a service manager 225, similar to the service manager 125 of FIG. 1, a primary network 205, similar to the primary network 105 of FIG. 1, and a first nested network 210a and a second nested network 210b, each of the first and second nested networks 210a, 210b similar to the nested network 110 of FIG. 1.

The service manager 225 can reduce data traffic in the primary network 205 by performing an optimization step similar to that described above in the context of FIG. 1. However, as there are several nested networks 210a, 210b, the optimization considers moving a user terminal 115 to the second nested network 210b, either from the primary network 205 or from the first nested network 210a.

According to certain embodiments, the service manager 225 can direct one or more user terminals 115 to move to the first nested network 210a to access a first group service and to the second nested network 210b to access a second group service. In this way, the primary network 205 need only send the first group service to the first nested network 210a and the second group service to the second nested network 210b.

Similarly, the service manager 225 can direct the first group service to move to the first nested network 210a and the second group service to move to the second nested network 210b. Additionally, the service manager 225 can direct any nested networks 210a, 210b that are not needed to stop offering a group service or even inactivated completely so that the nested networks 210a, 210b do not cause any wireless interference to any remaining active wireless networks in the vicinity.

Furthermore, the service manager 225 can direct the nested networks 210a, 210b to raise or lower their transmission power to globally improve the performance of the system 100 by managing wireless interference.

Figure 3:
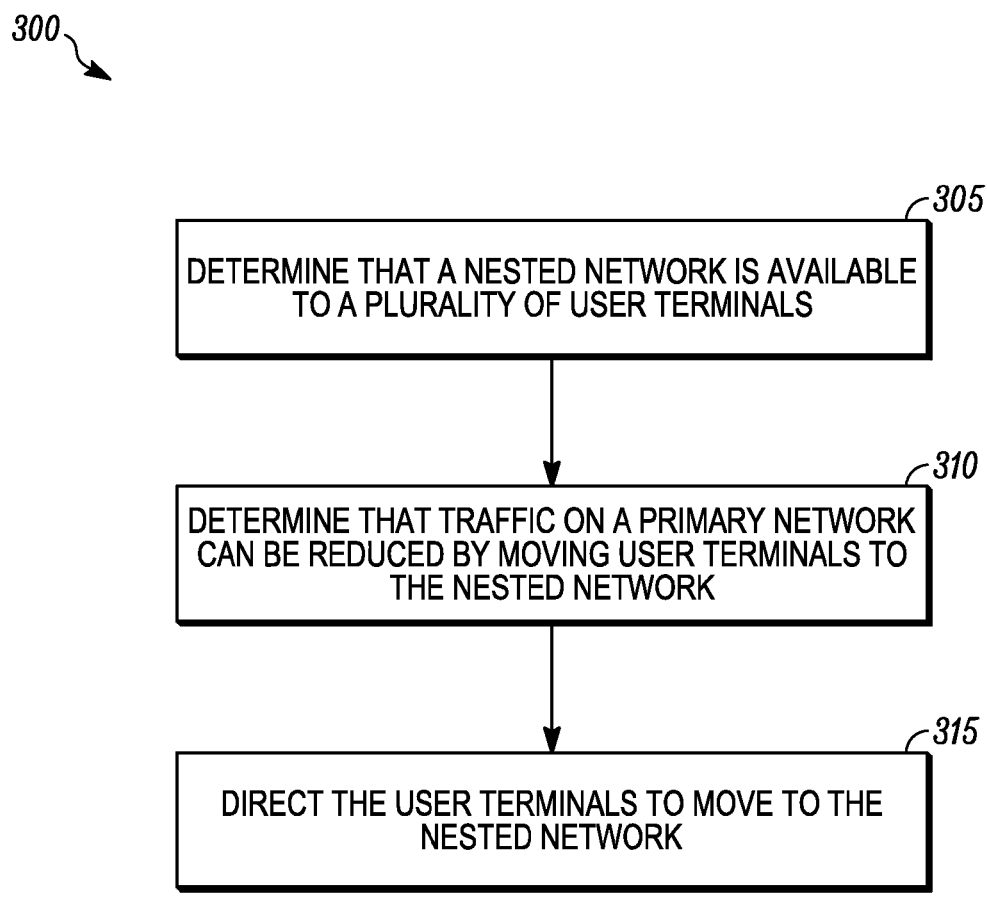
FIG. 3 illustrates a method of data communication, in accordance with some embodiments.

FIG. 3 illustrates a method 300 of data communication, according to an embodiment of the present invention.

In step 305, it is determined that a nested network is available to a plurality of user terminals.

According to certain embodiments, the locations of the plurality of user terminals are received either directly from the user terminals or from an external service. Similarly, the location of the nested network is also received, for example directly from the nested network, from an external service, or as reported by the user terminals.

Based upon relative locations, or as reported by the user terminals, for example, it can be determined that the nested network is available to the user terminals.

The locations of the user terminals and/or nested networks can be included in neighbor reports of a terminal, which describe the alternate wireless networks that are available to each user terminal. The neighbor reports can either be sent gratuitously or on-demand and can include signal strength information and other channel quality information such as current loading.

In step 310, it is determined that traffic on a primary network can be reduced by moving user terminals to the nested network. Traffic on the primary network can be reduced by minimizing the number of streams required on the primary network, e.g. the number of user terminals directly served by a primary network. If the nested network is a multicast network, a single unicast data stream can be sent to the nested network and then forwarded to several user terminals via multicast transmission by the nested network.

According to certain embodiments, a nested network is given a higher weight for selection if it already supports a group service, if a higher power/longer range nested network is supported, or if the nested network has low mobility and/or is centrally located.

Further, the moving of traffic may take into account hysteresis values to provide stability. A hysteresis factor can be incorporated in an algorithm in a variety of ways including adding a hysteresis factor to a "minimal acceptable quality" parameter, having a requirement on the selected group service to support a certain number of users, or having a dwell timer for running the algorithm so that reconfiguration does not occur too often.

According to certain embodiments, determining that traffic can be reduced is performed by receiving a list of group services being used by the user terminals. Such information can include, for example, that a user terminal is a group member of a certain talk group, or is receiving a certain group video stream. This information can be reported directly from the user terminal, from an external service, by an application server that is providing the group service, or by monitoring the traffic going through a service manager. Further, this information can be made available a priori or on-demand.

Based upon at least the availability of the nested network and the group service(s) being used, it can be determined that traffic on the primary network can be reduced by moving the user terminals to the nested network. Thus by selecting which user terminals should move to the nested network, bandwidth on the primary network can be reduced globally.

In step 315, the user terminals are directed to move to the nested network, i.e. connect to the nested network, for a group service. The user terminals may continue to use the primary network for other services.

According to certain embodiments, information regarding the user terminals and/or the nested networks, such as location, group services, neighbor reports and the like, is received periodically. According to other embodiments, such information is sent by the sender only upon detection of certain events at the sender such as detection of congestion in the primary network, preemption of traffic streams or dedicated bearers carrying the traffic streams, or availability of alternate networks detected. According to yet other embodiments, the information can be explicitly requested and sent on-demand. Such explicit requests can be the result of determining that the primary network is reaching its capacity. In other words, a request to the user terminals to scan for alternate networks is made when there is congestion in the primary network. Either way, the scan results with information about available nested networks are reported back by the user terminal. In response to receipt of this information, requests to direct a user terminal to the nested network can be made.

The request to connect to the nested network does not require the terminal to disconnect from the primary network. In other words, moving to the nested network can be in addition to maintaining the current primary network connectivity so that only certain group services are delivered via the nested network and other traffic is still received on the primary network.

Additional information about the group service on the nested network, such as connectivity information, can be provided to the user terminal and can include an IP multicast address and port numbers, any synchronization information, security material, etc. If the nested network does not already support the group service, a request can also be sent to the application server (on behalf of the user terminals) to serve the given alternate networks.

Figure 4:
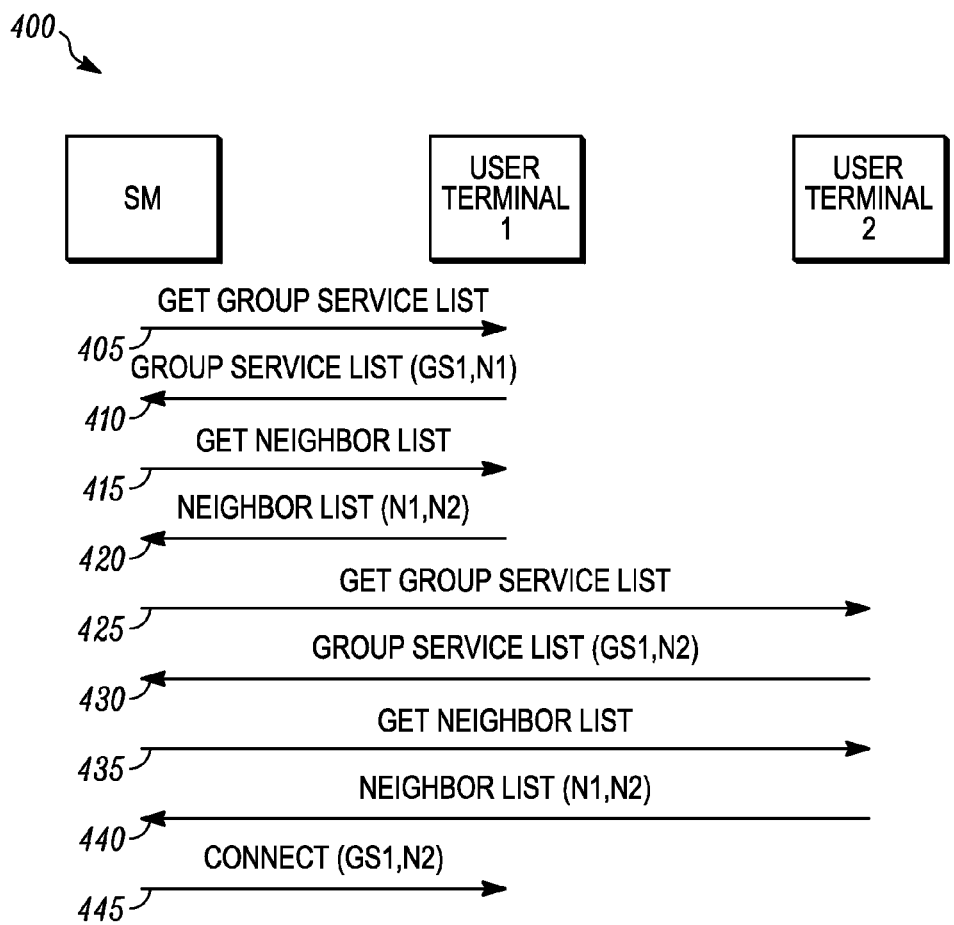
FIG. 4 illustrates a message sequence for a communication system, in accordance with some embodiments.

FIG. 4 illustrates a message sequence 400 for a communication system, according to an embodiment of the present invention. Similar to the data communication system 100 of FIG. 1, the communication system of FIG. 4 includes a first user terminal, a second user terminal and a service manager.

At 405, the service manager requests a group service list from the first user terminal, and at 410 the first user terminal responds with a list including a first group service (GS1) on a first network (N1).

At 415, the service manager requests a neighbor list from the first user terminal, and at 420 the first user terminal responds with a list including the first network (N1) and a second network (N2).

At 425, the service manager requests a group service list from the second user terminal, and at 430 the second user terminal responds with a list including the first group service (GS1) on the second network (N2).

At 435, the service manager requests a neighbor list from the second user terminal, and at 440 the second user terminal responds with a list including the first network (N1) and the second network (N2).

Figure 5:
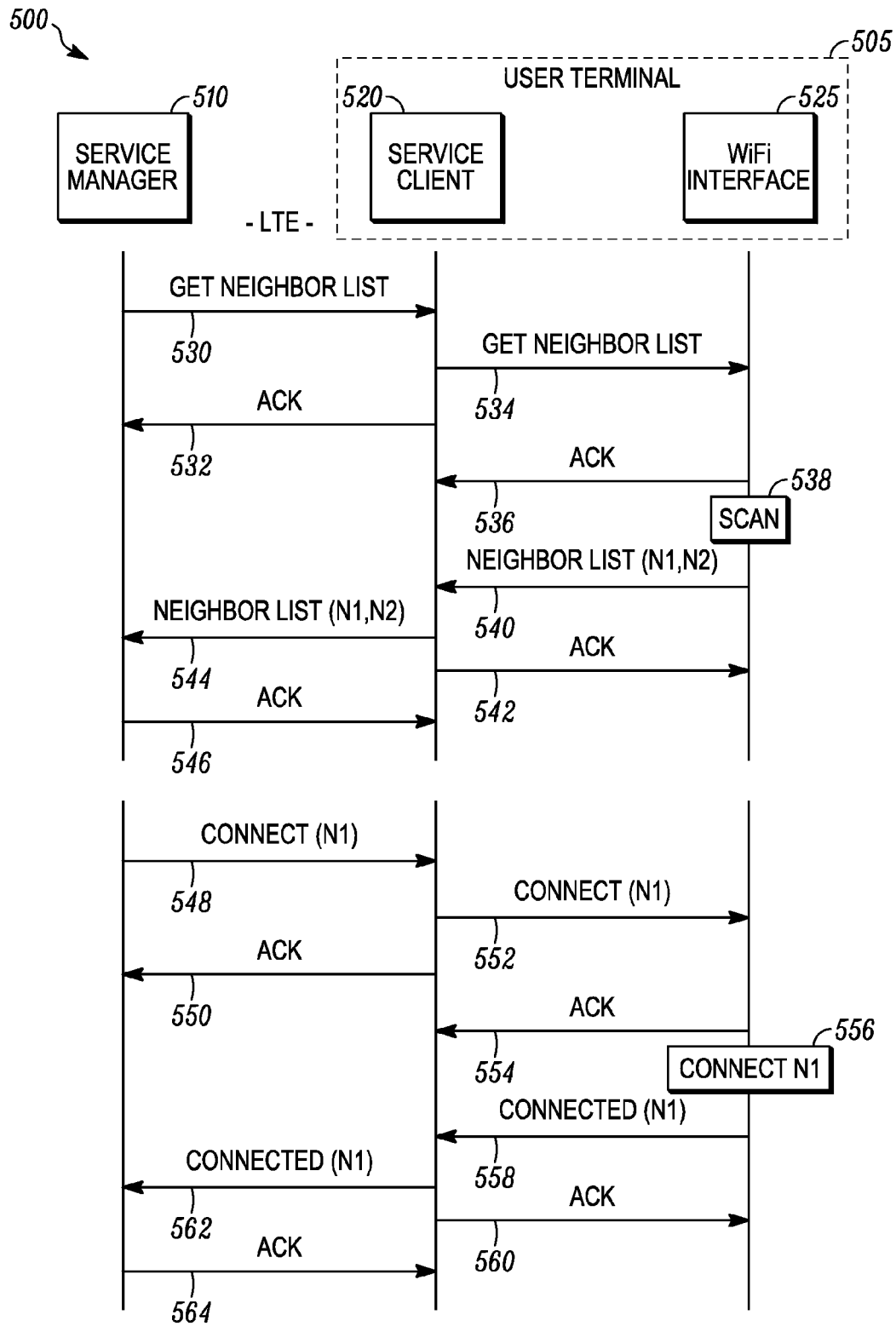
FIG. 5 illustrates a message sequence for requesting a neighbor list, in accordance with some embodiments.

At 445, the service manager requests the first user terminal to connect to the second network (N2) to receive the first group service (GS1). By making such a request, the service manager can ensure that the first group service (GS1) is delivered efficiently to both the first and second user terminal FIG. 5 illustrates a message sequence 500 for requesting a neighbor list from a user terminal 505 by a service manager 510 (that is, messages 530-546) and for requesting the user terminal 505 to connect to a nested network (that is, messages 548-564), according to some embodiments of the present invention. The user terminal 505 can be similar to the user terminal 115 of the system 100 of FIG. 1 and the service manager 510 can be similar to the service manager 125 of the system 100 of FIG. 1. Furthermore, the messages 530-546 can correspond to the steps 415 and 435 of FIG. 4. The message sequence 500 can be triggered by a variety of events such as but not limited to a) the service manager 510 determining that the primary network is reaching its capacity, b) the service manager 510 determining that the user terminal 505 is slated for preemption, c) the service manager 510 determining that the user terminal 505 is a part of a group service where some users need to be preempted, d) a third party software or human intervention determining a potential need to preempt the user terminal 505 over the primary network, or e) the service manager 510 periodically requesting neighbor reports from the user terminal 505.

Additionally, a parameter of the service manager 510, such as a traffic offloading parameter, may be used to trigger the message sequence 500. The parameter can, for example, be input by a graphical user interface (GUI) during runtime.

The user terminal 505 comprises a service client 520, which communicates with the service manager 510, and an IEEE 802.11 based wireless (WiFi) interface 525, which is used to access alternate networks in the vicinity. As will be understood by a person skilled in the art, the WiFi data interface is an example of a nested network data interface.

Initially, a get neighbor list request 530 is sent from the service manager 510 to the service client 520 of the user terminal 505, via a primary network such as an LTE network. In alternate embodiments, the get neighbor list request 530 is delivered over an alternate network. The service client 520 of user terminal 505 responds with an acknowledgement message 532. The service client 520 then directs the WiFi interface 525 to scan for available networks by sending a get neighbor list request 534 to the WiFi interface 525, which is acknowledged with an acknowledgement message 536.

As will be readily understood by a person skilled in the art, the service client 520 can be aware of all data interfaces present on the user terminal 505 and can accordingly forward the get neighbor list request 534 to any suitable interface. If several nested network interfaces are present (not shown), the get neighbor list request 534 can be sent to one or all of the alternate network interfaces.

At 538, the WiFi interface 525 scans for available networks. This can be performed using methods known in the art, including scanning for service set identifiers (SSIDs), analyzing received signal strengths from discovered networks, etc. This information is, then, compiled into a neighbor list.

A neighbor list message 540 is then sent from the WiFi interface 525 to the service client 520 of the user terminal 505, to which the service client 520 responds with an acknowledgement message 542. A neighbor list message 544 is sent from the service client 520 to the service manager 510 via the primary network, which is acknowledged with an acknowledgement message 546.

The neighbor lists can include SSIDs of the available networks, or any other suitable identifier, and can also include received signal strengths from each network, channel utilization or traffic load of each of the networks.

The service client 520 can aggregate neighbor lists from several nested networks interfaces and transmit these as individual neighbor lists or as a single combined neighbor list.

As will be readily understood by a person skilled in the art, the acknowledgement messages 532, 536, 542, and 546 need not be present, or can be present in an underlying protocol such as Transmission Control Protocol (TCP).

Messages 548-564 then illustrate a messaging sequence for requesting the user terminal 505 to connect to a nested network, for example, based on the neighbor list provided to the service manager 510, according to some embodiments of the present invention.

That is, the service manager 510 can request a user terminal 505 to connect to a nested network after it has received the neighbor list from the terminal, as described above. If, however, the neighbor list is requested periodically, the request to connect to the nested network is advantageously sent upon determining that the primary network is reaching its capacity, that the UE is slated for preemption, and/or that the UE is a part of a group call where some users need to be preempted.

The service manager 510 can select the nested network for the user terminal 505 based upon a Received Signal Strength Indication (RSSI) and availability of a group service in the nested network, or using an optimization technique to reduce the number of LTE streams required to support the group service such that each user terminal 505 gets a at least a minimal acceptable quality. Furthermore, higher weight can be given to certain nested networks due to, for example, a power output, range, or mobility of the nested network, and/or if the nested network is more centrally located.

Additionally, the service manager 510 can default to a given nested network, provided it is available to all relevant user terminals 505.

A connection request 548 is sent from the service manager 510 to the service client 520 of the user terminal 505, via the primary network, requesting the user terminal 505 to connect to nested network N1. In alternate embodiments, the connection request 548 is delivered over an alternate network. The service client 520 of user terminal 505 responds with an acknowledgement message 550. The service client 520 then directs the WiFi interface 525 to connect to network N1 by sending a connection request 552 to the WiFi interface 525, which is acknowledged with an acknowledgement message 554.

At 556, the WiFi interface 525 connects to network N1. Upon connection to the network N1, a connection confirmation 558 is sent from the WiFi interface 525 to the service client 520 of the user terminal 505, to which the service client 520 responds with an acknowledgement message 560. A connection confirmation message 562 is then sent from the service client 520 to the service manager 510 via the primary network, which is acknowledged with an acknowledgement message 564.

As will be readily understood by a person skilled in the art, the acknowledgement messages 550, 554, 560, and 564 need not be present, or can be present in an underlying protocol such as Transmission Control Protocol (TCP).

Figure 6:
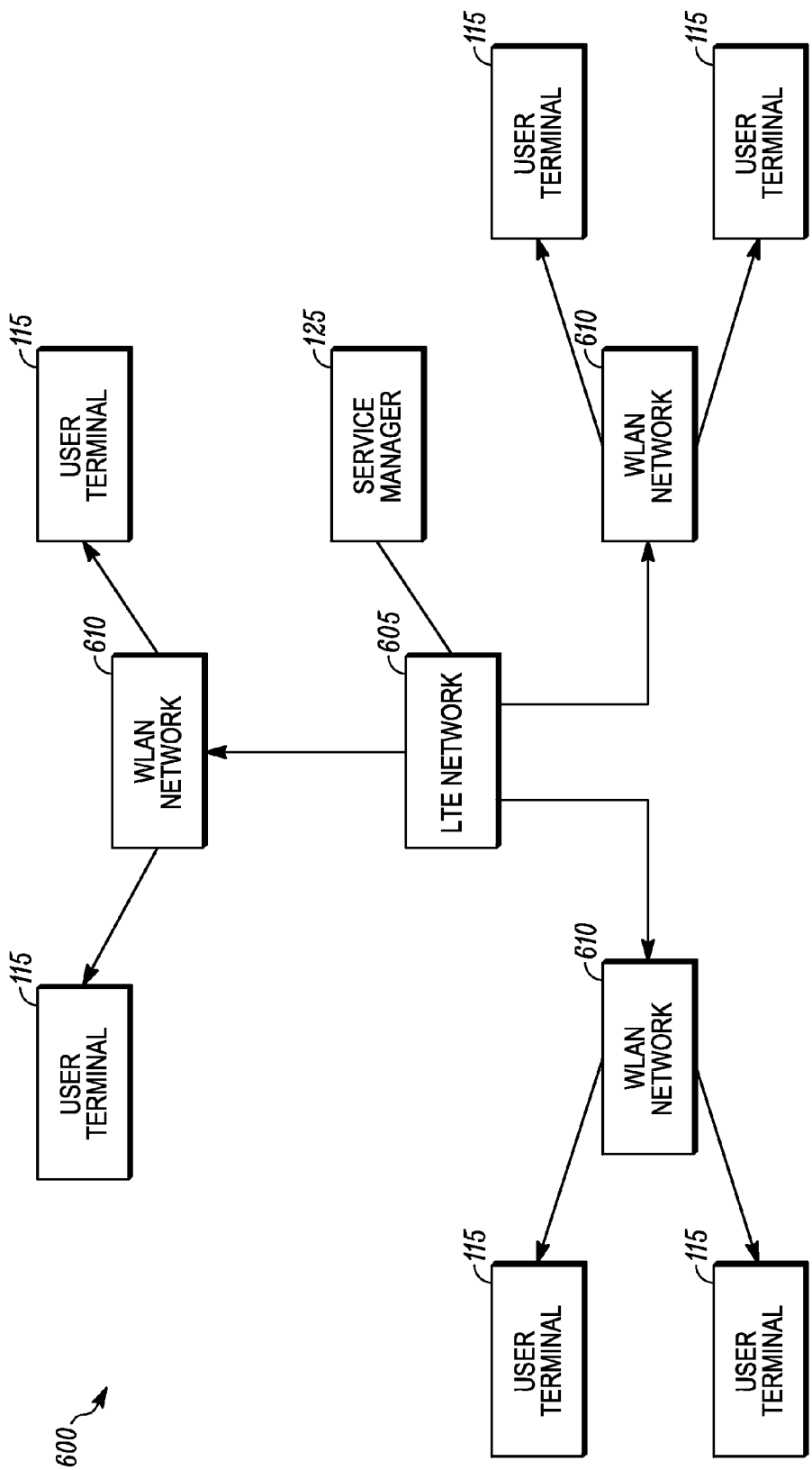
FIG. 6 illustrates a data communication system, in accordance with some embodiments.

FIG. 6 illustrates a data communication system 600, according to an embodiment of the present invention. The system 600 includes a primary network in the form of a 3 GPP Long Term Evolution (LTE) network 605 and a plurality of nested networks in the form of Wireless Local Area Network (WLAN) networks 610 connected to the LTE network 605. The LTE network 605 comprises at least one eNode-B and can further comprise an Evolved Packet Core and other functionality of an Evolved Radio Access Network. The WLAN network 610 provides a data interface to the LTE network 605 such that the WLAN networks 610 uses the LTE network 605 as part of its backbone. The WLAN networks 610 can comprise part of a vehicular network which is positioned in response to an emergency.

In one embodiment, the WLAN networks 610 comprise one or more access points. In another embodiment, the WLAN networks 610 comprise a handheld device that has access point functionality. In an alternate embodiment, the WLAN network 610 comprises one or more user terminals without any access points. Furthermore, in one embodiment, the WLAN networks 610 additionally comprise local application server functionality and/or local service manager functionality.

When multiple WLAN networks 610 are in a single area, the service manager can optimize network resource use as follows:

a) Merging two or more WLAN networks 610 if all (or most) relevant user terminals 115 can access both networks. In this case, one WLAN network 610 can be completely inactivated by the prioritization service manager to reduce the interference it may cause to another WLAN network 610 after the user terminals 115 are directed to move to the other WLAN network 610.

b) Splitting services across multiple WLAN networks 610, if all (or most) relevant user terminals 115 can access both networks. In this case, the prioritization service manager can direct a first WLAN network 610 to support a first service and a second WLAN network 610 to support a second service. This minimizes the number of LTE streams for each of the services.

c) Interference management. The prioritization service manager can direct WLAN networks 610 in to increase/decrease their transmission power in order to better manage interference in an area.

If a WLAN network 610 moves away, for example in the case of a mobile vehicular network, the user terminals 115 can transition back to the LTE network 605. According to certain embodiments, the service manager determines quality parameters of one or more user terminals 115 based on ongoing reporting from the user terminals 115, and proactively assigns different WLAN networks 610 (or the LTE network 605) for user terminals 115 that are likely to lose coverage from the WLAN network 610 to which they are currently connected. Accordingly, the service manager can facilitate a smooth transition back to the LTE network 605 or another WLAN network 610, where needed and if possible.

Alternatives to the LTE network 605 for the primary network include but are not limited to a WIMAX network, a Land Mobile Radio System (LMRS), or any other broadband or narrowband wireless technology. Alternatives to the WLAN network 610 for the nested network include, but are not limited to, an LTE picocell, an LTE femtocell, an LTE relay or any other broadband or narrowband wireless technology.

Figure 7:
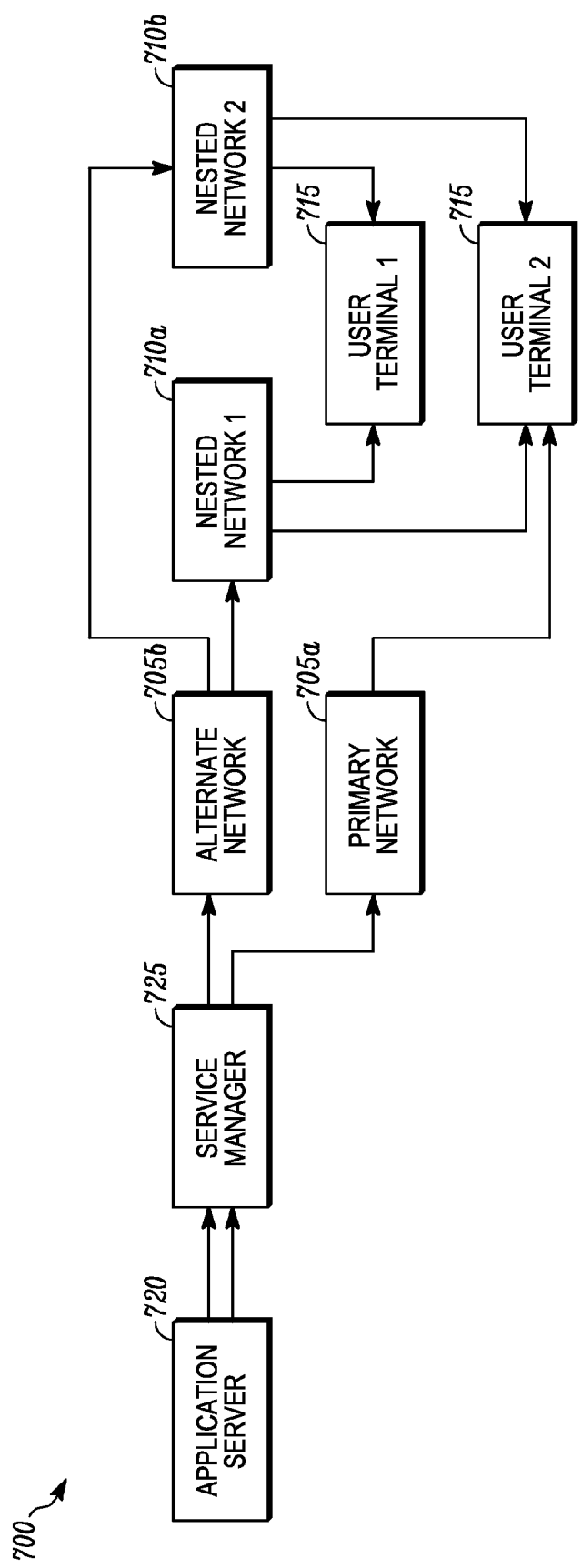
FIG. 7 illustrates a block diagram of a data communication system, in accordance with some embodiments.

FIG. 7 illustrates a block diagram of a data communication system 700, according to an embodiment of the present invention. The data communication system 700 is similar to the data communication system 100 of FIG. 1 and FIG. 2.

The data communication system 700 includes a primary network 705a, an alternate network 705b, and nested networks 710a, 710b connected to the alternate network 705b. The nested networks 710a, 710b provides a data interface to the alternate network 705b, i.e. the nested networks 710a, 710b use the alternate network 705b as part of their backbone. Note that even though the block diagram shows two nested networks 710a, 710b, nested within the alternate network 705b, it should be obvious to those skilled in the art that, in practice, there may be one or more nested networks, nested within the alternate network 705b.

One or more group services are made available to a plurality of user terminals 715 through an application server 720, similar to the application server 120. A service manager 725, similar to the service manager 125, controls whether the user terminals 715 connect to the primary network 705a, the alternate network 705b, and/or one of the nested networks 710a, 710b.

The service manager 725 monitors the plurality of user terminal 715, and can reduce data traffic in the alternate network 705b by performing an optimization step similar to that described above in the contexts of FIG. 1 and FIG. 2. However, as there is the primary network 705a, the alternate network 705b and several nested networks 710a, 710b, the optimization considers moving a user between any of these networks.

According to certain embodiments, the nested networks 710a, 710b are WiFi networks in the form of Vehicular Area Networks, the alternate network 705b is a public LTE network operated by an LTE service provider and the primary network is a private LTE network such as one operated privately by a public safety organization. However, as described above, other types of networks can be used.

The user terminals 715 can be simultaneously connected to the primary network 705a and the first nested network 710a, in order to avail any ongoing services within the first nested network 710a.

The service manager 725 can perform optimization similar to that described above in the context of the system 100 including, for example, directing one or more user terminals 715 to move to a nested network 710a, 710b to access a group service, directing a group service to move to a nested network 710a, 710b, and directing a nested network 710a, 710b to stop offering a group service.

Additionally, if the nested network 710a or 710b has a service ongoing that would not be turned off if a user terminal 715 did not join, or otherwise be associated with a cost to the nested network, the service manager 725 requests the user terminal 715 to use the ongoing service offered by the said nested network 710a or 710b without starting a new stream on the primary network 705a.

Furthermore, if the primary network 705a is nearly running out of capacity, the service manager 725 can request one or more of the plurality of user terminals to move to a nested network 710a, 710b to access services offered by the said nested network 710a, 710b directly or to access services offered by the alternate network 705b via the nested network 710a, 710b.

Note that using the methods described in this embodiment, the service manager 725 can increase the available spectrum or capacity available to the user terminals 715 by directing them to additionally avail services offered by the alternate network 705b via the nested network 710a, 710b, while still availing services offered on the primary network 705a. For example, if the alternate network 705b is offering a group video service over MBMS and the primary network is offering a second group video service, the user terminals 715 may avail both the group services simultaneously via the nested network 710a, 710b and the primary network 705a, respectively. Those skilled in the art will readily recognize that the services in this example need not be group services. Furthermore, the same group service with different features can be offered by both networks 705a & 705b. For example, if the group service over the primary network 705a is offered over MBMS and the user terminals 715 are not enabled with MBMS capability, then they can access these services via the nested network 710a, 710b, nested within the alternate network 705b, which in turn offers the same service to the nested network 710a, 710b, either over MBMS or over a unicast delivery mechanism.

FIG. 8 illustrates a computing system 800, according to an embodiment of the present invention. The service manager 125 of FIG. 1 can be identical or similar to the computing system 800, or be used to implement the methods described above.

The computing system 800 includes a network interface 805, a memory 810, a data store 815, and a processor 820 coupled to the network interface 805, memory 810, and data store 815.

The computing system 800 can include a system bus (not shown) that couples various system components, including coupling the memory 810 to the processor 820. The system bus can be any of several types of bus structures including a memory bus or memory controller, a peripheral bus, and a local bus using any of a variety of bus architectures.

The network interface 805 provides a data interface to the primary network, nested network(s) and user terminals. The network interface 805 can be used to request information from the user terminals, and send control messages to the user terminals and nested networks.

The computing system 800 can operate in a networked environment using logical connections to one or more remote computers or other devices, such as a server, a router, a network personal computer, a peer device or other common network node, a wireless telephone or wireless personal digital assistant.

The network interface 805 couples the system bus to a local area network (LAN) and/or a wide area network (WAN), such as the Internet. This can, for example, be achieved via a modem unit connected to a data interface of the computing system 800.

It will be appreciated that the network connections described are exemplary and other ways of establishing a communications link between computers can be used. The existence of any of various well-known protocols, such as TCP/IP, Frame Relay, Ethernet, FTP, HTTP and the like, is presumed, and the computing system 800 can be operated in a client-server configuration to permit a user to retrieve data from, for example, a web-based server.

The processor 820 processes computer readable program code components stored in the memory 810 and implements various methods and functions of the PSM as described herein. Examples of functions include determining a location of user terminals, requesting data from user terminals, and requesting user terminals to move to or from a nested network.

The data store 815 includes data, such as locations of fixed network elements, thresholds, and information about user terminals such as range and acceptable network protocols and standards. The computing system 800 can also include a variety of interface units and drives for reading and writing data.

In particular, the data store 815 can comprise a data storage interface coupling a solid state, hard disk drive and/or a removable memory drive to the system bus. Examples of removable memory drives include magnetic disk drives and optical disk drives. The drives and their associated computer-readable media, such as a Digital Versatile Disc (DVD) provide non-volatile storage of computer readable instructions, data structures, program modules and other data for the computer system 800. The computing system 800 and/or data store 815 can include several similar drives.

The processor 820 and memory 810 can be replaced by dedicated hardware, and the computing system 800 can include software, hardware, firmware, or any combination thereof.

The structure of system memory 810 is well known to those skilled in the art and can include a basic input/output system (BIOS) stored in a read only memory (ROM) and one or more program modules such as operating systems, application programs and program data stored in random access memory (RAM).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A data communication method including:
    determining a location of a plurality of user terminals;
    determining group services utilized by the plurality of user terminals;
    determining that user terminals in a same location are using a same group service;
    determining that traffic on a primary network can be reduced by moving one or more user terminals of the plurality of user terminals from the first primary network to the nested network when user terminals are similarly located and using the same group service, wherein the nested network comprises an air interface that operates in parallel with a separate air interface provided by the primary network such that a coverage area of the nested network overlaps with a coverage area of the primary network, and wherein the nested network uses network elements of the primary network to backhaul uplink data received from, and to receive downlink data intended for, one or more of the plurality of user terminals; and
    directing the one or more user terminals to move to the nested network.

2. The data communication method of claim 1, wherein determining that traffic on the primary network can be reduced comprises determining that a plurality of unicast streams on the primary network can be replaced by a single multicast stream on the nested network.

3. The data communication method of claim 1, further comprising: directing a group service to the nested network, wherein the group service is consumed by more than one user terminal.

4. The data communication method of claim 3, wherein group service comprises at least one of: streaming audio, streaming video, group push-to-talk, image transfer, interactive graphics and file download.

5. The data communication method of claim 1, further comprising:
    receiving indicators of group services consumed by each of the one or more user terminals,
    wherein determining that traffic on a primary network can be reduced is at least partly based upon the indicators.

6. The data communication method of claim 1, wherein determining that a nested network is available to one or more user terminals comprising:
    receiving a location of the one or more user terminals and a location of the nested network; and
    determining based upon the received locations, that the one or more user terminals are within range of the nested network.

7. The data communication method of claim 6, wherein a location of at least one of:
    the one or more user terminals; and the nested network is determined using an external service.

8. The data communication method of claim 1, further comprising:
    determining that traffic on the primary network can be reduced by moving one or more user terminals from the nested network to a second nested network; and
    directing the one or more user terminals to move to the second nested network.

9. The data communication method of claim 8, further comprising:
    performing one or more actions to reduce network interference between the nested network and the second nested network.

10. The data communication method of claim 9, wherein the one or more actions comprises directing the second nested network to decrease transmission power.

11. The data communication method of claim 9, wherein the one or more actions comprises:
    determining that a group service that is offered by both the nested network and the second nested network is consumed by a first set of user devices on the nested network and a second set of user devices on the second nested network;
    determining that both the nested network and the second nested network is accessible by the second set of user devices; and
    directing one or more of the second set of user devices from the second nested network to move to the nested network.

12. The data communication method of claim 11, further comprising:
    directing the second nested network to stop offering the group service.

13. The data communication method of claim 9, the one or more actions comprises:
    directing a first group service to move to the nested network and a second group service to a second nested network.

14. The data communication method of claim 1, wherein the primary network comprises: a Long Term Evolution (LTE) network, a Worldwide Interoperability for Microwave Access (WIMAX) network or a Land Mobile Radio System (LMRS), and the nested network comprises: a wireless local area network (WLAN) network, an LTE picocell or an LTE femtocell.

15. The data communication method of claim 1, further comprising:
    providing, to the one or more user terminals, connectivity information relating to the nested network.

16. A data communication system comprising;
    a primary network;
    a nested network connected to the primary network, wherein the nested network provides a data interface to the primary network; and
    a service manager including a processor and computer readable instruction code, executable by the processor, for:
        determining a location of a plurality of user terminals;
        determining group services utilized by the plurality of user terminals;
        determining that user terminals in a same location are using a same group service;
        determining that traffic on a primary network can be reduced by moving one or more user terminals of the plurality of user terminals from the first primary network to the nested network when user terminals are similarly located and using the same group service, wherein the nested network comprises an air interface that operates in parallel with a separate air interface provided by the primary network such that a coverage area of the nested network overlaps with a coverage area of the primary network, and wherein the nested network uses network elements of the primary network to backhaul uplink data received from, and to receive downlink data intended for, one or more of the plurality of user terminals; and directing the one or more user terminals to move to the nested network.

17. The data communication system of claim 16, further comprising a plurality of nested networks.

18. The data communication system of claim 17, wherein the service manager determines at least one of:

an optimal number of nested networks for a group service;

an optimal number of user terminals for a nested network and group service; and an optimal number of unicast and multicast streams for a group service, to be used in the system.

* * * * *

UNITED STATES PATENT AND TRADEMARK OFFICE
CERTIFICATE OF CORRECTION

PATENT NO. : 8,934,904 B2
APPLICATION NO. : 13/691003
DATED : January 13, 2015
INVENTOR(S) : Aparna Pandey et al.

It is certified that error appears in the above-identified patent and that said Letters Patent is hereby corrected as shown below:

IN THE TITLE PAGE:

On Page 2, item (56), under "OTHER PUBLICATIONS", in Column 2, Line 5, delete "Gybrid" and insert -- Hybrid --, therefor.

On Page 2, item (56), under "OTHER PUBLICATIONS", in Column 2, Line 10, delete "Wired/Sireless" and insert -- Wired/Wireless --, therefor.

On Page 2, item (56), under "OTHER PUBLICATIONS", in Column 2, Line 10, delete "Sec Ond" and insert -- Second --, therefor.

On Page 2, item (56), under "OTHER PUBLICATIONS", in Column 2, Line 11, delete "p. 31-31," and insert -- pp. 10-31, --, therefor.

IN THE SPECIFICATION:

In Column 8, Line 38, delete "terminal" and insert -- terminal. --, therefor.

IN THE CLAIMS:

In Column 16, Line 35, delete "(WIMAX)" and insert -- (WiMAX) --, therefor.

In Column 16, Line 43, delete "comprising;" and insert -- comprising: --, therefor.

Signed and Sealed this
Twenty-eighth Day of June, 2016

Michelle K. Lee
*Director of the United States Patent and Trademark Office*